United States Patent [19]

Smith

[11] 4,405,459

[45] Sep. 20, 1983

[54] OILY WATER SEPARATOR

[76] Inventor: Peter B. Smith, 11, Leverton Gate, Broome Manor, Swindon, Wiltshire, England

[21] Appl. No.: 344,680

[22] Filed: Feb. 1, 1982

Related U.S. Application Data

[63] Continuation-in-part of Ser. No. 199,466, Aug. 19, 1980, abandoned.

[30] Foreign Application Priority Data

Dec. 19, 1978 [GB] United Kingdom ............. 49120/78

[51] Int. Cl.$^3$ ............................................. B01D 21/00
[52] U.S. Cl. .................................................. 210/521
[58] Field of Search ............. 210/521, 522, 802, 487, 210/488, 232, 498

[56] References Cited

U.S. PATENT DOCUMENTS

| | | | |
|---|---|---|---|
| 2,207,399 | 7/1940 | Gaertner | 210/802 |
| 3,847,813 | 11/1974 | Castelli | 210/522 |
| 3,957,656 | 5/1976 | Castelli | 210/521 |
| 4,122,017 | 10/1978 | Tanabe et al. | 210/522 |

Primary Examiner—Ivars C. Cintins
Attorney, Agent, or Firm—W. R. Hulbert

[57] ABSTRACT

An oily water separator which has a plurality of parallel corrugated plates between which the oil/water mixture is constrained to flow, adjacent plates being separated by spacing forms smoothly shaped to provide substantially laminar flow therepast in a direction generally transverse to the corrugations, each spacing form being positioned between two plates at a crest or at a trough in the corrugations and having a leading edge serving to divide the flow therepast at said crest or trough, which edge extends generally tangentially to the said crest or trough of one of the respective plates.

10 Claims, 11 Drawing Figures

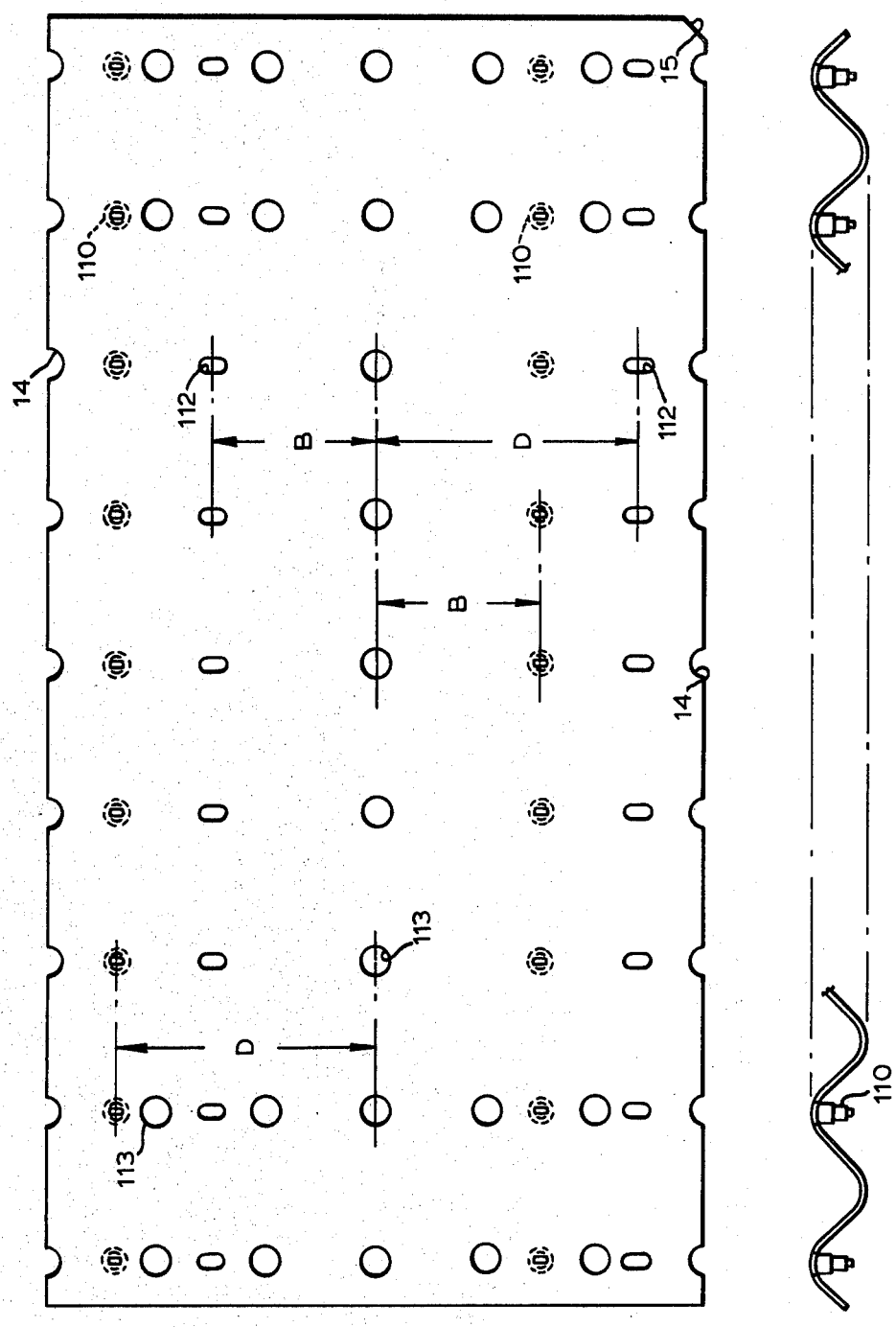
Fig.6
Fig.7

OILY WATER SEPARATOR

This is a continuation-in-part application of U.S. patent application Ser. No. 199,466, filed Aug. 19, 1980, now abandoned.

FIELD OF THE INVENTION

This invention relates to an oily water separator of the plate type and in particular to coalescer plates for use therein.

BACKGROUND OF THE INVENTION

Examples of oily water separators of the plate type are described in U.S. Pat. Nos. 3,847,813 and 3,957,656. It will be seen that the basis of the separation resides in the provision of a plurality of corrugated separator plates mounted parallel to one another. The plates are sinusoidal or approximately so in cross section. The oil/water mixture is caused to flow between the parallel plates (which may be arranged in a parallel horizontal fashion as in U.S. Pat. No. 3,957,656 or in a somewhat inclined fashion as in U.S. Pat. No. 3,847,813), the effect of the sinusoidal path being alternatively to accelerate and to decelerate the fluid. These changes in velocity of the fluid which occur in directions both tangential to and normal to plate surfaces, combined with the inertial effects of differently sized oil droplets, tend to cause the droplets to coalesce. The coalesced oil droplets are suitably led off through weep holes in the crests of the corrugations.

The overall effect of the apparatus is that as the oil/water mixture progresses along the length of the separator, the oil gathers preferentially towards the top of the vessel. Oil is withdrawn from the top of the vessel at the end of the paths through the parallel plates and purified water from the bottom of the vessel.

A problem arises in aligning the plates with proper separation. The separation is all important since it is the varying separation normal to the direction of general flow which accounts in large part for the resulting coalescence. Alternative modes of interconnection between the parallel plates are described and illustrated in the two U.S. patents aforementioned. A further means of interconnection and separation which the assignees of the present inventor have used will be described below with reference to FIGS. 1 and 2 of the accompanying drawings. These prior proposed arrangements are not entirely satisfactory for the reasons which will be explained below with reference to FIGS. 1 and 2.

BRIEF DESCRIPTION OF THE INVENTION

As will become clear from the detailed description, I have devised a different mode of separating the parallel plates, with attendant advantages as will become clear from the detailed description of preferred embodiments of separator plate given below with reference to FIGS. 3 to 11 of the accompanying drawings.

I describe below a preferred embodiment of oily water separator which is constructed in accordance with the present invention and has a stack of parallel corrugated plates between which an oil/water mixture is constrained to flow, the plates being separated in said stack one from the other by spacing means provided thereon, the spacing means defining alternative first and second predetermined spacings, either of which may be selected between any two adjacent plates of the stack.

In preferred embodiments the spacing means are provided integrally with the plates, and comprise a depending portion of the upper or superposed plate at a crest in the corrugation or an upstanding portion of the lower or underposed plate at a trough in the corrugations and corresponding location means respectively located on the lower or underposed plate or on the upper or superposed plate. The configuration and arrangement of these depending or upstanding portions and the corresponding location means are preferably such that turning alternative plates through 180° in their own plane changes the spacing between respective pairs of adjacent plates from said first to said second spacing and vice-versa.

The invention is hereinafter more particularly described by way of example only with reference to the accompanying drawings.

BRIEF DESCRIPTION OF THE DRAWINGS

FIG. 6 is a plan view of a second embodiment of plate for an oily water separator constructed in accordance with the present invention.

FIG. 7 is a side elevational view of the plate of FIG. 6.

DESCRIPTION OF THE PRIOR ART

Figure 1:
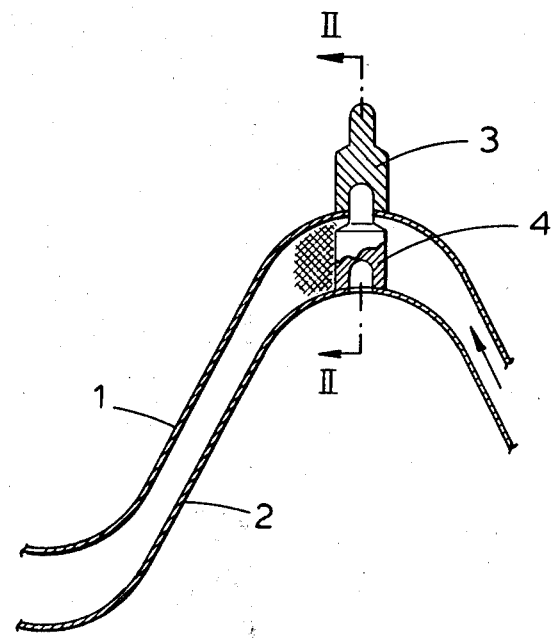
FIG. 1 shows a schematic side elevational view of two plates of a prior proposed oily water separator of the plate type.
Figure 2:
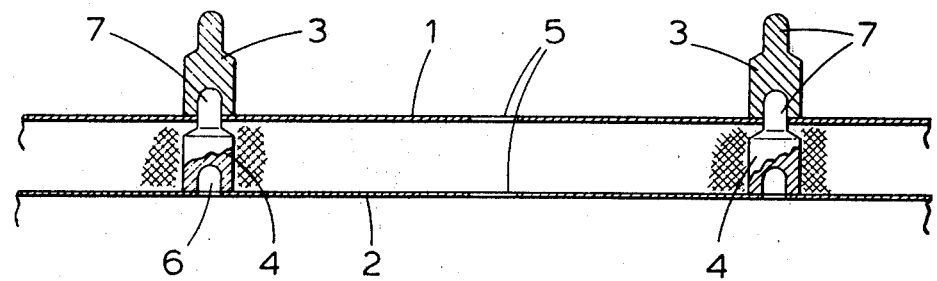
FIG. 2 is a sectional view through the plates shown in FIG. 1 taken along the line II—II.

Referring first to FIGS. 1 and 2 which show, somewhat schematically, two plates 1 and 2 of an oily water separator as previously manufactured by Fram Europe Limited. The plates, of which the plates 1 and 2 are but two of a plurality, are generally arranged horizontally, rather in the manner illustrated in FIG. 1 of U.S. Pat. No. 3,957,656, with the crests and troughs in the corrugations extending transverse to the general direction of flow of fluid through the apparatus.

A typical separation between the plates 1 and 2 at the crests and troughs would be of the order of 6 mm. Respective spacing studs are integrally moulded with the plates at suitable positions along each crest, as shown at 3 and 4 in FIGS. 1 and 2. Weep holes 5 are also provided along the crests to allow coalescing oil droplets to migrate to the top of the apparatus. It will be noted that each stud defines a recess 6 into which the distal end of a corresponding stud on the next adjacent plate may be received. Thus, the distal end 7 of studs 4 of plate 2 are received in the recesses 6 of studs 3 of plate 1.

The arrangement described and illustrated in FIGS. 1 and 2 has a fixed spacing between the plates, as equally well have the plates of U.S. Pat. No. 3,847,813. Where a different spacing is required different plates with modified spacers must be made. The fixed spacing also means that the stacked plates take up a substantial volume when transported. For this reason it has sometimes proved more convenient in the past to fabricate the plates on site for mounting inside the water separator tank. The arrangement illustrated in FIGS. 1 and 2 may also create turbulence in approximately 10% of the flow area under certain flow conditions. Since for best results with parallel corrugated plate separators, the flow should be smoothly accelerated and decelerated by passage between the plates, such turbulence is a disadvantage. The regions in which turbulence may arise are shown by hatching in FIGS. 1 and 2. The turbulence will tend to break up oil droplets for which coalescence has already taken place.

DESCRIPTION OF THE PREFERRED EMBODIMENTS OF THE INVENTION

Figure 3:
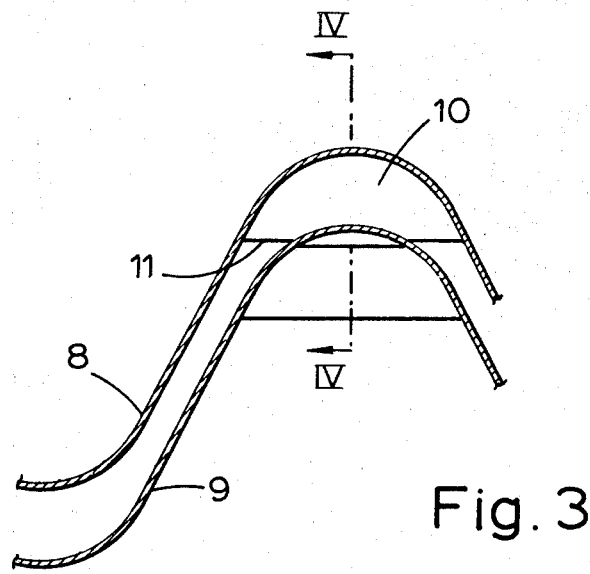
FIG. 3 is a view generally similar to FIG. 1 showing two plates of an oily water separator constructed in accordance with the present invention.
Figure 4:
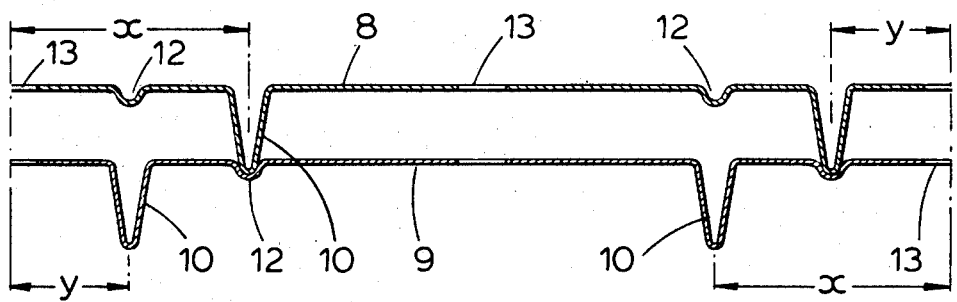
FIG. 4 is a view generally similar to FIG. 2 but taken along the line IV—IV in FIG. 3.

Referring now to FIGS. 3 and 4, there are shown, again somewhat schematically, two plates 8 and 9 of a plurality. The plates may be arranged to extend horizontally or may be somewhat inclined, for example rather in the manner of the plates shown in FIG. 6 of U.S. Pat. No. 3,847,813.

It will be seen that the arrangement illustrated in FIGS. 3 and 4 provides plate separations comparable with those of FIGS. 1 and 2, that is of the order of 6 mm.

Each plate is provided with a plurality (only 2 shown) of integrally formed spacing means comprising depending spacing forms 10 for separating the respective plate from its adjacent underposed plate. The spacing forms 10 are smoothly shaped to provide substantially laminar flow therepast in a direction generally transverse to the corrugations. As illustrated, the spacing forms 10 are provided at the crests in the corrugations, but those skilled in this art will readily appreciate that the spacing forms could alternatively (or additionally) be provided at the troughs in the corrugations. It will be appreciated that if the drawing is turned upside down, the spacing forms upstand at the troughs. In the orientation illustrated each spacing form 10 is provided by a portion which depends from the remainder of the plate at the crest to form a leading edge 11 which serves to divide the incoming fluid flow to the said crest so as to pass the spacing form 10 with substantially laminar flow. It will be seen that the edge 11 extends generally tangentially to the crest of the underposed plate 9 when the plates are supported one upon the other with the separation shown in FIGS. 3 and 4. It will be seen from FIG. 4 that edges 11 of spacing forms 10 locate in locating means in the form of minor indents 12 in the crest of the underposed plate. Weep holes 13 are provided at lengths spaced along the respective crests. Similar holes may also be provided in the troughs.

Figure 5:
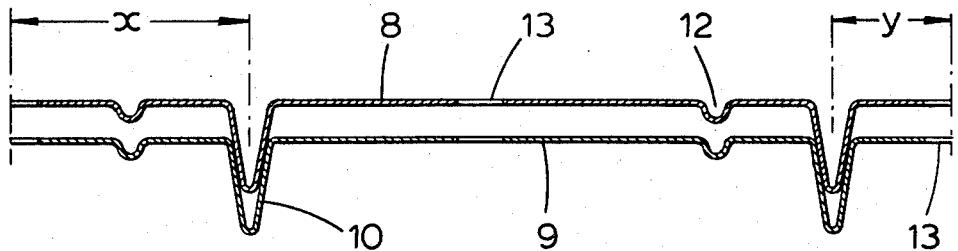
FIG. 5 is a view generally similar to FIG. 4 but showing how the plates of FIGS. 3 and 4 may be arranged for stacking.

It will be noted from FIG. 4 that at the left side thereof, plate 8 has a spacing form 10 separated from the centre line of a weep hole 13 by a distance X while plate 9 has the centre line of a spacing form 10 spaced from the centre line of the corresponding weep hole by a distance Y. At the right hand side of FIG. 4, this space relationship is shown reversed. Consequently, when, as shown in FIG. 5, plate 9 is reversed (that is turned through 180° in its own plane), the two plates will nest with spacing form to spacing form producing, as shown, a much reduced spacing between the plates. Thus the described embodiment of separating plate enables a choice to be made depending on the separation conditions encountered as to whether a relatively lower number of plates with a relatively wider separation therebetween, or a relatively higher number of plates with a relatively narrower separation therebetween, are to be utilised. Since the plates stack one upon the other and are essentially self-supporting with minimal need for support at their edges, considerable flexibility becomes possible with the same plates, avoiding the need to carry plural stocks of plates or separate spacers to give different separations or of having to manufacture special plates for each different separation condition encountered. The two alternative separations defined in the plates of this invention may be employed in the same separator simply by reversing selected plates only in the stack. The narrower or nested separation is selected for transport and storage as it minimises space requirements.

The configuration of plate illustrated in FIGS. 3, 4 and 5 is suitable for various forms of manufacture, including injection moulding, vacuum forming, and extruding and fabricating. The particular method chosen for the manufacture of these plates will depend upon a proper evaluation of costs bearing in mind the material chosen and the equipment available. Extrusion and fabrication, using polypropylene is presently preferred. A plain corrugated sheet to whatever dimensions are required is first extruded. While the plastics material is still soft, a tool is brought into contact with the crests in the corrugations to form the depending portions 10 and indents 12. Polypropylene has oleophilic characteristics which may be improved by giving the plates a surface treatment, as for example by a silicone coating which is then cured. The efficiency of separation in parallel plate separators of the kind with which the present invention is concerned depends on the accurate separation of one plate from the next. The separations of FIG. 4 or 5 are not always readily reproducible when, for example, plates such as those described hereinabove with reference to FIGS. 1 to 5 are fabricated on site. Additionally, in a substantial stack of plates, the weight of superposed plates will bear upon the lower plates in the stack and may tend to change the separation, particularly in the FIG. 5 arrangement where the separation depends upon an interference between one depending spacing form and another. Where greater accuracy in the separation between plates in the stack is required and turbulence is not considered so serious a problem, we prefer to employ the embodiment of plate described hereinbelow with reference to FIGS. 6 to 11, wherein reference numerals for like parts to parts of the embodiment of FIGS. 1 to 5 are employed but increased by 100.

Figure 8:
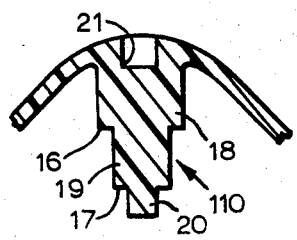
FIG. 8 is an enlarged sectional view taken along the line VIII—VIII in FIG. 6 and illustrating a depending spacer pin.

Referring now to FIG. 6, there is shown in plan a separator plate which in a practical embodiment may suitably have a length of the order of 2 ft. and a width of the order of 1 ft. The plate is corrugated, as is clear from the side view of FIG. 7. As shown in the plan view of FIG. 6, the plate has a plurality of weep holes 113 which are located along the centre line of the plate and also along the crests of the endmost pair of corrugations at either end of the plate. Spacing means in the form of depending spacer pins 110 best shown in the enlarged sectional view of FIG. 8 are located one at the crest of each corrugation along a line separated from the centre line of the plate by a distance D at one side of the plate and along a similar line separated from the centre line of the plate by a distance B at the other side of the plate. A plurality of location slots 112 are similarly located one at the crest of each corrugation along two lines, one separated from the centre line of the plate by a distance D at one side of the plate and the other separated from the centre line of the plate by a distance B at the other side of the plate. Thus, it will be seen that the arrangement of spacer pins 110 and location slots 112 is complementary at the two sides of the plate. Cut-outs 14 located at the respective crests of the corrugation are provided along each longitudinal marginal edge of the plate and serve a locating function when the plate is mounted in a separator tank to ensure that the plates are located in the correct positions both longitudinally and width-wise. One corner 15 of the plate is trimmed along an oblique line for a purpose to be explained below.

Referring now to FIG. 8, it will be noted that the spacer pins 110 are integrally formed with the plates as a whole. The pins are essentially cylindrical in form and are provided with two shoulders 16 and 17 so that the pin effectively tapers from its root to its distal end and defines a wide cylindrical section 18, an intermediate cylindrical section 19 and a distal end cylindrical portion 20. It will also be noted that there is provided on the centre line of the pin and at the crest of the corrugation a recess 21 which is dimensioned to receive the distal end cylindrical portion 20 of a superposed plate, as will be explained below.

Figure 9:
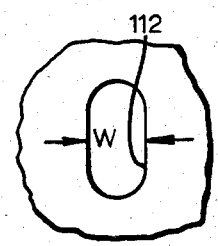
FIG. 9 is an enlarged detail view of a location slot shown in FIG. 6 and with which the spacer pin of FIG. 8 is adapted to cooperate in the location and separation of one plate relative to another.

Referring now to FIG. 9, there is shown to an enlarged scale and in plan, one of the slots 112. Slot 112 is elongate and rounded at its ends and has a width W adapted to receive the intermediate portion 19 of a pin 110 of a superposed plate, again as explained below. As in the first embodiment described above with reference to FIGS. 1 to 5, the embodiment of plate illustrated in FIGS. 6 to 9 is adapted to provide two alternative spacings between adjacent plates of a stack.

Figure 10:
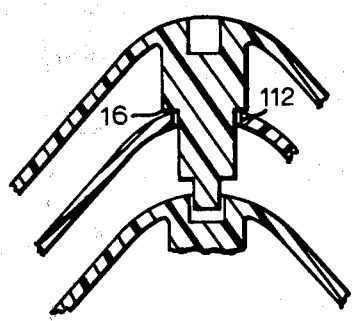
FIG. 10 is an enlarged view in section of the spacing means of three plates constructed as in FIG. 6 in the first relative spacing.
Figure 11:
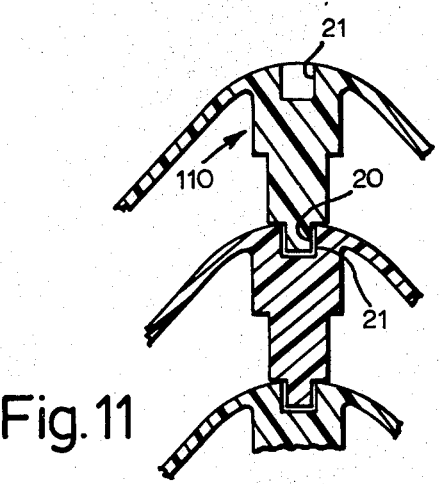
FIG. 11 is a view similar to FIG. 10 showing one plate turned through 180° in its own plane to give the second relative spacing between the plates.

Referring now to FIGS. 10 and 11, it will be seen that when identical plates are stacked one on top of each other in the orientation of FIG. 6, the distal end portion 20 of each pin will be received in the locating recess 21 on the centre line of the equivalent pin 110 of the next underposed plate, as shown in FIG. 11. As will be apparent from FIG. 6 and the complementary arrangement of the pins 110 and locating slots 112, if alternative plates are turned through 180° in their own plane, each pin will confront a location slot 112 of the underposed plate rather than the location recess 21 of an underposed plate. As mentioned above, the dimension of the slot 112 is such that the intermediate portion 19 of the pin 110 will be received therethrough with shoulder 16 resting on the sides of the slot, as shown in FIG. 10. Thus, with the arrangement described above with reference to FIGS. 6 to 11, either one of two predetermined alternative spacings may be selected between each adjacent pair of plates. When setting up a stack of plates, the assembling engineer need only check whether the trimmed edges 15 coincide (in which case the wider spacing such as a nominal half inch will be selected) or whether the trimmed edges 15 are present only at each alternative plate of the stack (in which case the narrower spacing, for example a nominal quarter inch, will be selected).

It will be understood that the converse arrangement is also within the scope of the present invention, that is with the spacing pins upstanding from troughs in the corrugations rather than depending from crests as in the illustrated arrangement. An illustration of such an arrangement can be seen by turning FIG. 7, for example, upside down.

What is claimed is:

1. An oil/water separator which has a stack of parallel plates between which an oil/water mixture is constrained to flow, the plates being separated in said stack one from the other by spacing means provided thereon, the spacing means defining alternative first and second predetermined spacings, either of which may be selected between any two adjacent plates of the stack.

2. An oil/water separator according to claim 1, wherein the spacing between any two adjacent plates of said stack may be changed from said first predetermined spacing to said second predetermined spacing and vice-versa by turning one said plate through 180° in its own plane.

3. An oil/water separator according to claim 2, wherein the spacing means are provided integrally with the plates and comprise a portion of a superposed plate depending at a crest in the corrugation thereof and received in said first spacing in a first location means located on an underposed plate and received in said second spacing in a second location means provided on said underposed plate.

4. An oil/water separator according to claim 3, wherein the spacing means comprise spacing forms depending from superposed plates at crests in the corrugations and located in said first spacing in minor indents defined at the crests of underposed plates, the spacing forms being received within similar depending spacing forms at the crests of underposed plates in the second spacing.

5. An oil/water separator according to claim 4, wherein the spacing forms are smoothly shaped to provide substantially laminar flow therepast in a direction generally transverse to the corrugations, each spacing form having a leading edge serving to divide the flow therepast at the crest in the corrugation, said edge extending generally tangentially to the said crest.

6. An oil/water separator according to claim 3, wherein the spacing means comprise spacer pins depending from superposed plates at crests in the corrugations, and wherein said first location means comprise location recesses located on the centre lines of similar spacer pins of underposed plates at the crests thereof, the spacer pins having distal end portions which are received in said first spacing in said location recesses; and wherein the spacer pins have portions intermediate their length of a lateral dimension greater than the lateral dimension of said distal end portions, and wherein said second location means comprise location slots formed in underposed plates at the crests thereof and being spaced from said location recesses, said intermediate portions being received in said second spacing in corresponding said location slots.

7. An oil/water separator according to claim 2, wherein the spacing means are provided integrally with the plates and comprise a portion of an underposed plate upstanding at a trough in the corrugation thereof and received in said first spacing in a first location means located on a superposed plate and received in said second spacing in a second location means provided on said superposed plate.

8. An oil/water separator according to claim 7, wherein the spacing means comprise spacing forms upstanding from underposed plates at troughs in the corrugations and located in said first spacing in minor indents defined at the troughs of superposed plates, the spacing forms being received within similar upstanding spacing form at the troughs of superposed plates in the second spacing.

9. An oil/water separator according to claim 8, wherein the spacing forms are smoothly shaped to provide substantially laminar flow therepast in a direction generally transverse to the corrugations, each spacing form having a leading edge serving to divide the flow therepast at the crest in the corrugation, said edge extending generally tangentially to the said crest.

10. An oil/water separator according to claim 7, wherein the spacing means comprise spacer pins upstanding from underposed plates at troughs in the corrugations, and wherein said first location means comprise location recesses located on the centre lines of similar spacer pins of superposed plates at the troughs thereof, the spacer pins having distal end portions which are received in said first spacing in said location recesses;

and wherein the spacer pins have portions intermediate their length of a lateral dimension greater than the lateral dimension of said distal end portions, and wherein said second location means comprise location slots formed in superposed plates at the troughs thereof and being spaced from said location recesses, said intermediate portions being received in said second spacing in corresponding said location slots.

* * * * *